United States Patent [19]

Eun

[11] Patent Number: 6,119,015

[45] Date of Patent: Sep. 12, 2000

[54] METHOD AND APPARATUS FOR SYNCHRONIZING SYNCHRONOUS INFORMATION OF EACH BASE STATION IN CORDLESS TELEPHONE SYSTEM

[75] Inventor: Jin-Puo Eun, Seoul, Rep. of Korea

[73] Assignee: SamSung Electronics Co., Ltd., Suwon, Rep. of Korea

[21] Appl. No.: 08/937,458

[22] Filed: Sep. 25, 1997

[30] Foreign Application Priority Data

Sep. 25, 1996 [KR] Rep. of Korea ............... 96-42645

[51] Int. Cl.$^7$ .................. H04B 7/005; H04B 7/01; H04B 7/015; H04J 3/06
[52] U.S. Cl. ................... 455/502; 370/350; 370/503
[58] Field of Search ........................ 455/502, 422, 455/465, 403, 436, 438, 524, 561, 70, 88, 421, 67.1, 560; 370/504, 331, 510, 503, 506, 347, 509, 350, 520, 366, 363; 375/356, 354, 366, 363

[56] References Cited

U.S. PATENT DOCUMENTS

| | | | |
|---|---|---|---|
| 5,329,635 | 7/1994 | Wadin et al. | 455/438 |
| 5,347,562 | 9/1994 | Candy | 370/280 |
| 5,396,541 | 3/1995 | Farwell et al. | 455/403 |
| 5,473,668 | 12/1995 | Nakahara | 455/465 |
| 5,519,759 | 5/1996 | Heineck et al. | 455/422 |
| 5,625,888 | 4/1997 | Rüther et al. | 455/462 |
| 5,666,366 | 9/1997 | Malek et al. | 370/505 |
| 5,787,078 | 7/1998 | Geywitz et al. | 455/502 |

*Primary Examiner*—Dwayne D. Bost
*Assistant Examiner*—Raymond B. Persino
*Attorney, Agent, or Firm*—Robert E. Bushnell, Esq.

[57] ABSTRACT

A cordless telephone system synchronizes a frame number, a multi-frame number, and a primary scan carrier number (PSCN) of every base stations, to provide an inter-cell handover between the base station. The cordless telephone system includes a plurality of slave base station connectors each having a plurality of base stations connected thereto, a master base station connector having a plurality of the base stations connected thereto, and a plurality of DECT terminals connected to the base stations, wherein the cordless telephone system provides a radio communication service to a DECT terminal subscriber accommodated by a PABX or key system. The cordless telephone system initializes the slave base station connectors, requests a multi-frame transmission to the master base station connector when an interrupt for synchronization is generated, and transfers a multiframe number to the slave base station connector when a next interrupt is generated from the master base station connector. Therefore, a frame number and the multiframe number and a PSCN of all base stations are synchronized.

13 Claims, 4 Drawing Sheets

METHOD AND APPARATUS FOR SYNCHRONIZING SYNCHRONOUS INFORMATION OF EACH BASE STATION IN CORDLESS TELEPHONE SYSTEM

CLAIM FOR PRIORITY

This application makes reference to, incorporates the same herein, and claims all benefits accruing under 35 U.S.C. § 119 from an application for METHOD FOR SYNCHRONIZING SYNCHRONOUS INFORMATION OF EACH BASE STATION IN CORDLESS TELEPHONE SYSTEM earlier filed in the Korean Industrial Property Office on Sep. 25, 1996, and there duly assigned Ser. No. 42645/1996, a copy of which application is annexed hereto.

BACKGROUND OF THE INVENTION

1. Technical Field

The present invention relates to a cordless telephone system such as a wireless private automatic branch exchange (PABX) or a key phone system providing a radio communication service, and more particularly, to a method for synchronizing a frame number, a multi-frame numbs and a primary scan carrier number (PSCN) of every base stations in a DECT (Digital European Cordless Telecommunications) cordless telephone system.

2. Related Art

Initially, DECT was intended mainly to be a private system, to be connected to a private automatic branch exchange (PABX) to give users mobility, within PABX coverage, or to be used as a single cell at a small company or in a home. As the idea with telepoint was adopted and generalized to public access, DECT became part of the public network. DECT was created to interface seamlessly to existing and future fixed networks such as public switched telephone network (PSTN), integrated services digital network (ISDN), global system for mobile communication (GSM), and PABX. DECT cordless telephone systems can be classified in three groups according to use, first as residential cordless telephone system used in residential districts, then as public cordless telephone systems, and lastly, as business cordless telephone systems used in office buildings. A particular example of such cordless telephone systems is the Second Generation Cordless System (CT2) with digital common air interface (CAI) specification. CT2 cordless telephone systems provide radio communication services by using frequency division multiple access (FDMA)/time division multiplex (TDD). However, current CT2 cordless telephone systems do not provide an effective inter-cell handover, and in case of using a single antenna, need a combiner/divider.

DECT cordless telephone systems employ standard radio connection technique specified by the European Telecommunications Standards Institute (ETSI) to provide radio communication services based on time division multiple access (TDMA)/time division duplex (TDD). In its simplest form, each DECT system has a base station with at least one mobile unit. More complex systems contain several base stations each having several mobile units. Exemplars of contemporary DECT systems are disclosed in detail in ETS 300 175-1 to 175-9, EP 0 486 089, entitled *"Effective Carrier Scanning Method in Terminal"*, EP 0 445 887, entitled *"Method for Optimizing Beacon Message in Base Station"*, EP 0 587 225, entitled *"Method for Transmitting Data to DECT Communication Channel."*

Such DECT cordless telephone systems perform radio connection based on the standards specified by ETSI as follows:

Frequency Band: 1880–1900 MHz
Number of Carriers: 10
Carrier Spacing: 1.728 MHz
Peak Transmit Power: 250 mW
Carrier Multiplex: TDMA (24 slots per frame)
Frame Length: 10 ms
Basic Duplexing: TDD using 2 slots on same RF carriers
Gross Bit Rate: 1152 kbit/s
Net Channel Rates:
    32 kbit/s (B-field per slot)
    6.4 kbit/s (control/signaling per slot)

Generally, base station of the DECT cordless telephone system provides a 10 msec synchronization pulse to synchronize DECT bursts for effective inter-cell handover operations. Contemporary techniques for the synchronization of base stations in such a cordless telephone system are disclosed, for example, in U.S. Pat. No. 5,329,635 for Seamless Handoff For Radio Telephone Systems issued to Wadin et al., U.S. Pat. No. 5,347,562 for Synchronizing Groups Of Base Stations In Time Division Duplex Communication Systems issued to Candy, U.S. Pat. No. 5,396,541 for Call Handoff In A Wireless Telephone System issued to Farwell et al., U.S. Pat. No. 5,473,668 for Digital Cordless Telephone System Readily Capable Of Setting Up issued to Nakahara, U.S. Pat. No. 5,519,759 for Method For The Synchronization Of Base Stations In A Multicellular, Wireless Telephone System issued to Heineck et al., U.S. Pat. No. 5,625,888 for Process For Combining Transmitting/ Receiving Devices Of A Cordless Communication System To Form A Communicating Unit issued to Ruther et al., and U.S. Pat. No. 5,666,366 for Inter-Base Synchronization Technique For A TDMA Communication System issued to Malek et al. However, I have observed that the frame number, the multi-frame number, and the primary scan carrier number (PSCN) of the respective base stations are not synchronized. As a result, inter-cell handover may not be effectively managed.

SUMMARY OF THE INVENTION

Accordingly, it is therefore an object of the present invention to provide a DECT cordless telephone system with inter-base synchronization.

It is also an object to provide a method for synchronizing a frame number, a multiframe number, and a PSCN of every base stations in a DECT cordless telephone system.

It is another object of the present invention to provide a method for processing an inter-cell handover between base stations in a DECT cordless telephone system.

These and other objects of the present invention can be achieved by a method for synchronizing synchronous information of each base station in a cordless telephone system providing radio communication services to a DECT terminal subscriber accommodated by a PABX or a key system which includes a plurality of slave base station connectors each having a plurality of base stations connected thereto, a master base station connector having a plurality of the base stations connected thereto, and a plurality of DECT terminals connected to the base stations. The synchronization method includes initializing the slave base station connectors; requesting a multiframe transmission to the master base station connector, if an interrupt for synchronization is generated; and if a next interrupt is generated from the master base station connector, transferring a multiframe number to the slave base station connector, whereby a frame number and the multiframe number and a PSCN of all base stations are synchronized.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
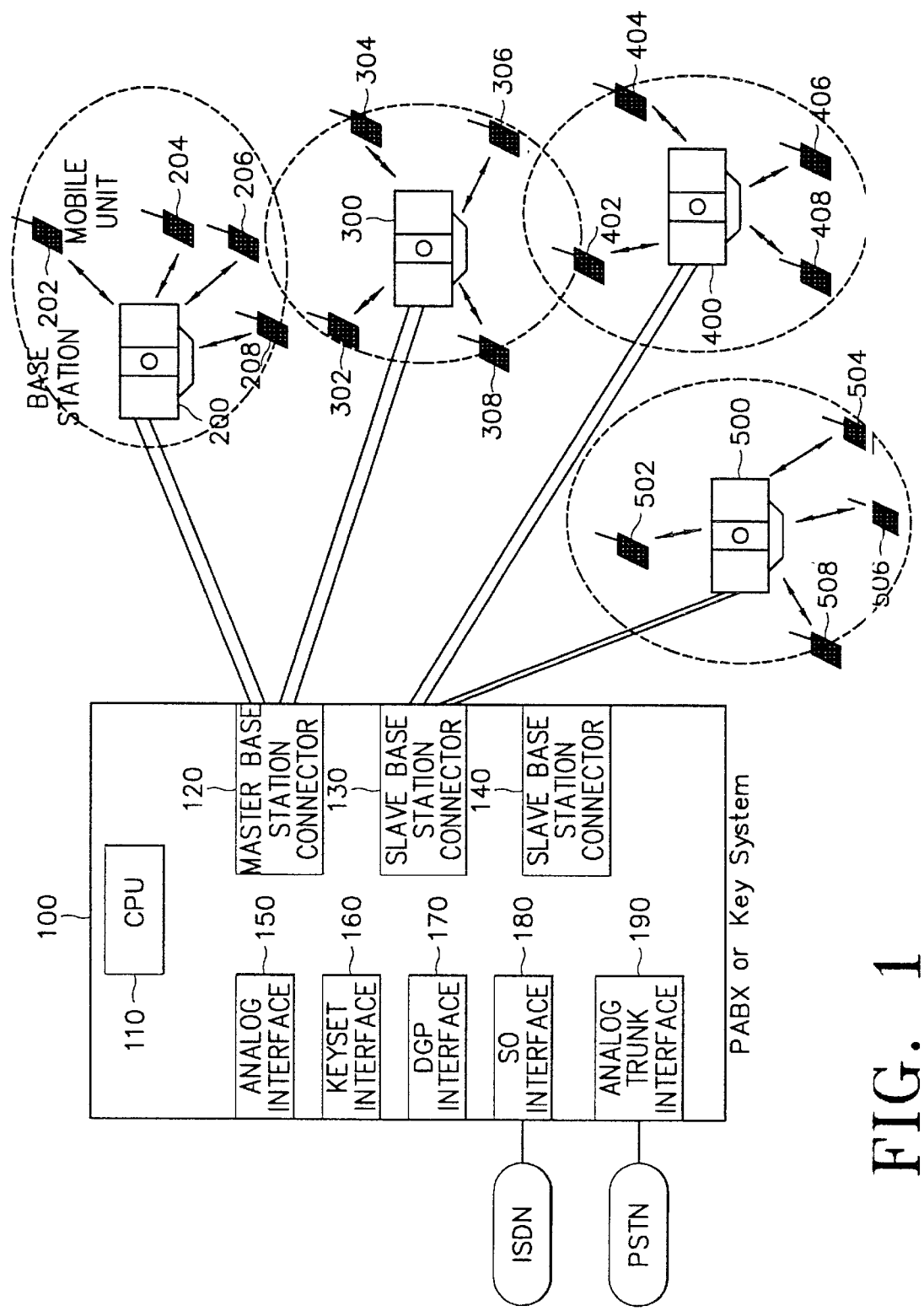
FIG. 1 is a block diagram of a cordless telephone system accommodating a DECT terminal constructed according to the principles of the present invention.

Referring now to the drawings and particularly to FIG. 1, which illustrates a cordless telephone system accommodating a DECT terminal subscriber according to the present invention. As shown in FIG. 1, the cordless telephone system includes a main system 100 which can be either a private automatic branch exchange (PABX) or a key system. The main system 100 includes a central processing unit (CPU) 110, a master base station connector 120, and a plurality of slave base station connectors 130 and 140. In addition, the main system 100 includes an analog interface 150, a keyset interface 160, a DG-phone (DGP) interface 170, an SO-interface 180, and an analog trunk interface 190, which are all generally used in the conventional PABX or key system. The CPU 10 controls an overall operation of communication services including the radio communication service provided to the DECT terminal according to the present invention. It should be noted that though not illustrated in the drawing, the main system 100 further includes necessary elements for providing communication services, for example, a switching circuit, a ring detector, a ring oscillator, and a dud tone multi-frequency (DTMF) circuit. The analog interface 150, the keyset interface 160, and the DGP interface 170 are provided to interface with a common telephone, a key phone, and a digital phone, respectively. The SO-interface 180 and the analog trunk interface 190 are provided to interface with an ISDN (Integrated Services Digital Network) and a PSTN (Public Switched Telephone Network), respectively.

Figure 2:
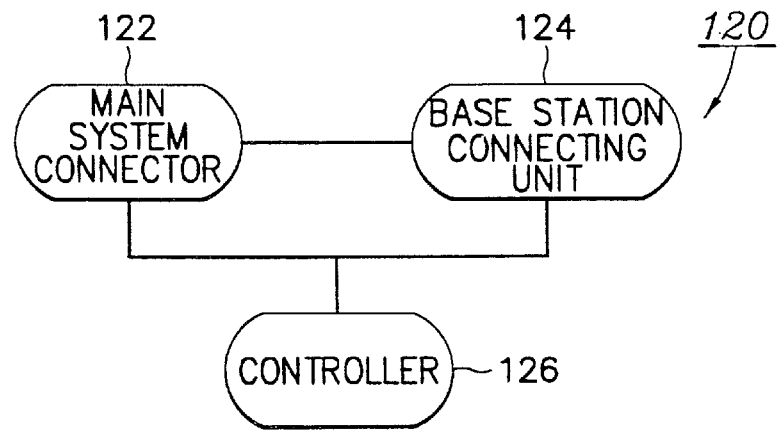
FIG. 2 is a block diagram of a base station connector 120 of the main system 100 constructed according to the principles of the present invention.

Main system 100 constructed according to the present invention includes a master base station connector 120 for providing the radio communication service to a DECT terminal (mobile unit), and a plurality of the slave base station connectors 130 and 140, which are mounted into slots prepared therein. The master base station connector 120 has the same configuration as that of the slave base station connectors 130 and 140, as illustrated in FIG. 2. The CPU 110 establishes one of the same base station connectors as the master base station connector 120, and the others as the slave base station connectors 130 and 140. It should be noted that the number of the base station connectors remains a variable at the designer's discretion.

The master base station connector 120 is connected to a plurality of base stations 200 and 300 via wires, and the slave base station 130 is connected to a plurality of base stations 400 and 500 via wires. The respective base stations are wirelessly connected to a plurality of the mobile units. For example, the base station 200 is connected to mobile units 202–208, the base station 300 is connected to mobile units 302–308, the base station 400 is connected to mobile units 402–408, and the base station 500 is connected to mobile units 502–508.

The respective base stations 200, 300, 400, and 500 communicate with the mobile units via radio communication channels to perform a cell site function in a medium access control (MAC) layer of a DECT protocol which is based on the International Standards Organization (ISO) open systems interconnection (OSI) seven-layer model including a physical (PH) layer, a medium access control (MAC) layer, a data link control (DLC) layer, and a network (NWK) layer for the node-to-node communication. For example, the physical (PH) layer is responsible for the segmentation of the transmission media into physical channels using TDMA operation on ten carriers between 188 and 1900 MHz with each carrier containing a TDMA structure defined as 24 timeslots per frame of 10 ms for the transmission of data packets. The MAC layer is used to select the physical channels and then establishes or releases connections on those channels. It also multiplexes/demultiplexes control information in slot-sized data packets. These function provide three groups of MAC services: broadcast service, connection oriented service, and connectionless service. The DCL layer provides a reliable data link to the network (NWK) layer. The DECT-DCL layer separates the operation into two independent planes of protocol: the C plane and the U plane. The C plane is the control plane of the DECT protocol stacks, and is common to all applications and provides reliable links for the transmission of internal control signalling and limited user information traffic. The U plane is the user plane of the DECT protocol stacks, and provides a family of alternative services optimized to the specific application. The network (NWK) layer is the main signalling layer of the protocol, and supports the establishment, maintenance, and release of the connections.

The respective slave base stations 130 and 140 communicate with the base stations connected thereto in order to perform a cluster control function in the MAC layer of the DECT protocol together with the mobile units that have tried to make a connection with the respective slave base stations 130 and 140. Thereafter, the respective slave base stations 130 and 140 transfer primitives generated by the cluster control function to the master base station connector 120, and perform the cluster control function according to the primitives received from the master base station connector 120. The master base station connector 120 makes a communication with the base stations 200 and 300 connected thereto to perform the cluster control function in the MAC layer of the DECT protocol together with the mobile units 204–208 and 304–308 and process a protocol of the data link control (DLC) and network (NWK) layers. Further, the masterbase station connector 120 processes the protocol of the DLC and NWK layers together with the mobile units connected to the slave base station connectors 130 and 140. Thereafter, the master base station connector 120 communicates with the CPU 110 and converts the primitives received therefrom with the protocol, to perform the DECT protocol or notify the primitives to the CPU 110 according to the result of performing the DECT protocol, in order to provide the radio communication service.

FIG. 2 illustrates a detailed block diagram of the master base station connector 120 and the slave base station connectors 130 and 140. As stated above, the master base station connector 120 and the slave base station connectors 130 and 140 have the same configuration.

Referring to FIG. 2, the base station connector includes a main system connector 122, a base station connecting unit 124, and a controller 126. The main system connector 122 covers a connecting operation to the conventional PABX or key system. The base station connecting unit 124 exchanges a signal with the base station to make a connection to the base station. The controller 126 controls an operation of the main system connector 122 and the base station connecting unit 124.

Specifically, the main system connector 122 transmits and receives various signals and control data in order to realize a voice communication with the main system for accommodating the DECT terminal subscriber. The control data transmission/reception can be realized by a dual port random-access-memory (RAM), a synchronization communication, and an asynchronous communication. The control data is used when converting the primitives received from the main system 100 to perform the DECT protocol or transferring the primitives to be notified to the main system 100 in order to provide the radio communication service. The slave base station connector transmits and receives the primitives according to the cluster control function of the MAC layer, and the master base station connector transmits and receives the primitives according to the protocol processing of the data link control (DLC) and network (NWK) layers.

The base station connecting unit 124 connected to the base station transmits and receives voice data, control data for processing DECT protocol, and a base station synchronous signal to/from the base station. Specifically, the voice data received from the base station is transferred to the main system 100 via the base station connecting unit 124 and the main system connector 122. The voice data from the main system 100 is transferred to the base station via the base station connecting unit 124 and the main system connector 122. The control data, received from the base station 200, 300, 400, or 500 for processing the DECT protocol is transferred to the controller 126, and the control data and synchronous signal received from the controller 126 are transferred to the base station.

The controller 126 controls an overall operation of the base station connector, and includes a memory for storing a database and a program for controlling the base station connector. The program for controlling the master base station connector 120 includes a software (for example, link access procedure balanced "LAPB", and link access procedure "LAP" for the D-channel "LAPD", or Asynchronous software) for securing a connection and a reliable communication with the base station connected thereto, a MAC layer multi-bearer control software for controlling a multiplexing and a management of all the data by way of a MAC layer connection to the mobile unit, a data link control (DLC) layer processing software for providing reliable data link to the network (NWK) layer, a NWK layer processing software which is a main signaling layer of the DECT protocol a software for securing a connection and a reliable communication with the main system 100, and a software for processing a connection to the slave base station connectors 130 and 140.

The program for controlling the slave base station connector includes a software (for example, LAPB, LAPD, or Asynchronous software) for securing a connection and a reliable communication with the base station connected thereto, a MAC layer multi-bearer control software for controlling a multiplexing and a management of all the data by way of a MAC connection to the mobile unit, and a software for processing a connection to the master base station connector 120.

The database stores information with respect to the mobile unit, information with respect to the slave base station connectors and the base stations, and various variables for securing a DECT protocol processing and a reliable communication with the base station.

Figure 3:
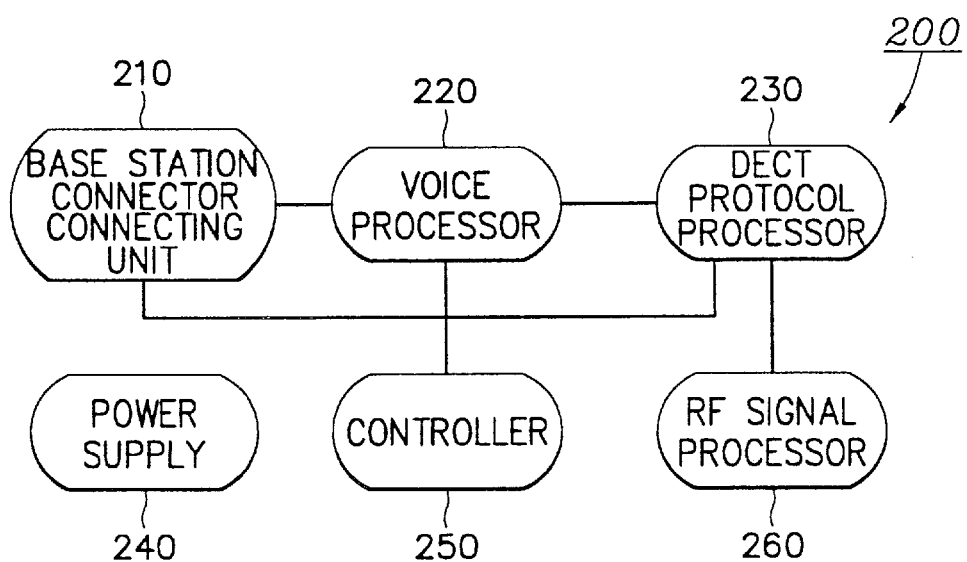
FIG. 3 is a block diagram of a base station 200 constructed according to the principles of the present invention.

FIG. 3 illustrates the base station 200 constructed according to the principles of the present invention with base stations 300, 400, and 500 being of a similar construction. As shown in FIG. 3, each base station includes a base station connector connecting unit 210, a voice processor 220, a DECT protocol processor 230, a power supply 240, a controller 250, and a radio-frequency RF signal processor 260. The base station connector connecting unit 210 is connected to the base station to exchange a signal with the base station connector 120, 130, or 140. The voice processor 220 processes the voice signal from the base station connector connecting unit 210 to transfer the same to a DECT protocol processor 230 and/or processes the voice signal from the DECT protocol processor 230 to transfer the same to the base station connector connecting unit 210. The DECT protocol processor 230 connected to an RF signal processor 260 processes a part of a physical (PH) layer and the MAC layer of the DECT protocol. A controller 250 controls an operation of the base station connector connecting unit 210, the voice processor 220, and the DECT protocol processor 230. The RF signal processor 260 processes an RF signal to allow the communication between the base station and the mobile unit. A power supply 240 provides the base station with the supply voltage.

Specifically, the base station connector connecting unit 210 is connected to the base station to transmit and receive the voice data, the control data for processing the DECT protocol, and the base station synchronous signal to/from the base station connector. That is, the base station connector connecting unit 210 transfers the voice data received from the base station connector to the voice processor 220, transfers the voice data received from the voice processor 220 to the base station connector, transfers the control data for processing the DECT protocol received from the base station connector to the controller 250, transfers the control data received from the controller 250 to the base station connector, and transfers the base station synchronous signal received from the base station connector to the DECT protocol processor 230. Further, the base station connector connecting unit 210 provide the power supply 240 with the supply voltage from the base station connector.

The voice processor 220 receives the voice data from the base station connector connecting unit 210 to suppress and remove an echo therefrom, and converts a pulse code modulation (PCM) signal into an adaptive differential pulse code modulation (ADPCM) signal to transfer the ADPCM signal to the DECT protocol processor 230. Further, the voice processor 220 converts the ADPCM signal received from the DECT protocol processor 230 into the PCM signal, and suppress and remove the echo therefrom to transfer it to the base station connector connecting unit 210.

The DECT protocol processor 230 processes a part of the PH layer and the MAC layer of the DECT protocol, transfers the ADPCM voice data received from the voice processor 220 to the RF signal processor 260, and transfers the voice data received from the RF signal processor 260 to the voice processor 220.

Controller 250 includes a memory for storing the database and the various control programs to control an overall operation of the base station. Further, the controller 250 is connected to a maintenance terminal to check a status of the base station, if necessary. The control programs include a software (LAPB, LAPD or asynchronous software), a software for establishing, sustaining and releasing a dummy bearer, a software for establishing, sustaining and releasing a traffic bearer, a software for controlling a broadcast message, and a software for controlling a radio connection. The database stores an ID (identification) value assigned to the base station, and various variables for processing the software stated above.

Power supply 240 converts a DC level of the supply voltage from the base station connector connecting unit 210 or the supply voltage from a power adaptor, to provide the DC-to-DC conversion voltage to each part of the base station.

Figure 4:
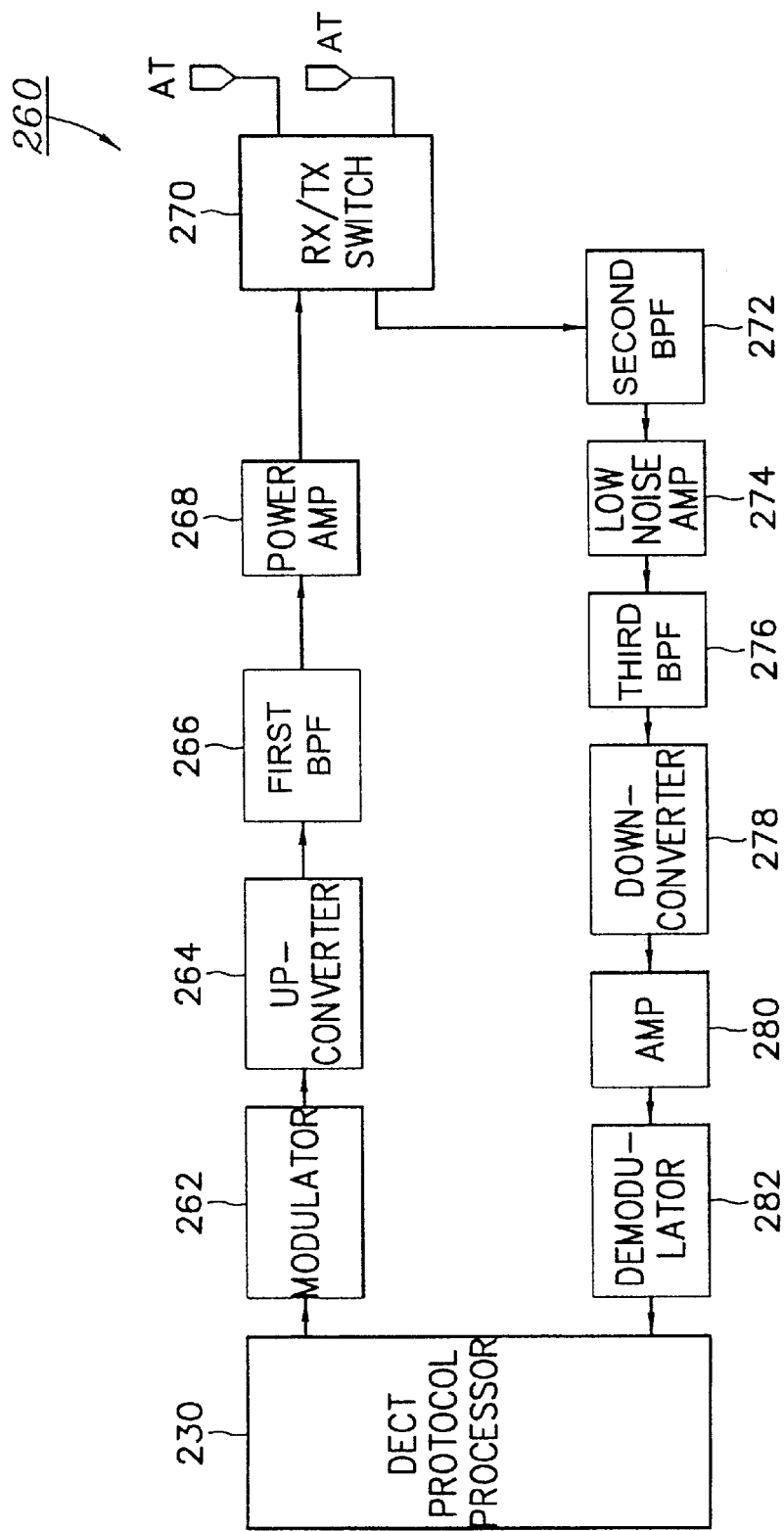
FIG. 4 is a detail block diagram of an RF signal processor 260 of the base station 200 shown in FIG. 3.

FIG. 4 illustrates a detail block diagram of the RF signal processor 260 of the base station 200 according to the present invention. As shown in FIG. 4, the RF signal processor 260 which is connected to the DECT protocol processor 230, includes a modulator 262, an up-converter 264, a first band-pass filter 266, a power amplifier 268, a reception/transmission (Rx/Tx) switch 270, a second band-pass filter 272, a low noise amplifier 274, a third band-pass filter 276, a down-converter 278, an amplifier 280, and a demodulator 282.

Modulator 262 which is realized by a Gaussian filter modulates data from the DECT protocol processor 230. The up-converter 264 doubles a frequency of the modulation data from the modulator 262. The first band-pass filter (BPF) 266 receives an output of the up-converter 264 and filters a signal component of 1.88–1.9 GHz frequency band that the system uses. The power amplifier 268 amplifies a power of a signal output from the bandpass filter 266. The transmission/reception switch 270 switches over to transmit or receive the RF signal to/from the antenna AT, under the control of the DECT protocol processor 230.

Second band-pass filter 272 receives the RF signal received through the antenna AT to filter the signal component of 1.88–1.9 GHz frequency band. The low noise amplifier 274, which is a high fidelity amplifier, amplifies a weak signal received from the antenna AT. The third band-pass filter 276 receives a signal output from the low noise amplifier 274 to filter the signal component of 1.88–1.9 GHz frequency band. The down-converter 278 converts the frequency of the received signal into a frequency of 110.592 MHz. The amplifier 280 amplifies an output of the down-converter 278. The demodulator 282 then extracts data from the modulated RF signal. An output of the demodulator 282 is applied to the DECT protocol processor 230.

In a transmission mode, the modulator 262 modulates 1.152 Mbps signal received from the DECT protocol processor 230 and the up-converter 264 doubles the frequency of the modulated signal. The bandpass filter 266 filters the output of the up-converter 264 to remove an unnecessary frequency component therefrom. The power amplifier 268 amplifies a power of the signal output from the bandpass filter 266. The amplified signal output from the power amplifier 268 is propagated in the air through the transmission/reception switch 270 and the antenna AT. As shown in FIG. 4, the antenna AT is of a diversity type, so that the communication terminal may use one of the two antennas and switch over to another antenna, if necessary.

In a reception mode, the RF signal received through the antenna AT is bandpass-filtered by the bandpass filter 272 to pass the signal component of 1.88–1.9 GHz. The bandpass-filtered signal is amplified by the low noise amplifier 274 and bandpass-filtered again by the bandpass filter 276. The 1.88–1.9 GHz frequency of bandpass-filtered signal is converted down to the low frequency of 110.592 MHz. The down-converted signal is amplified by the amplifier 280 and demodulated by the demodulator 282. The demodulated data is transferred to the DECT protocol processor 230.

Figure 5:
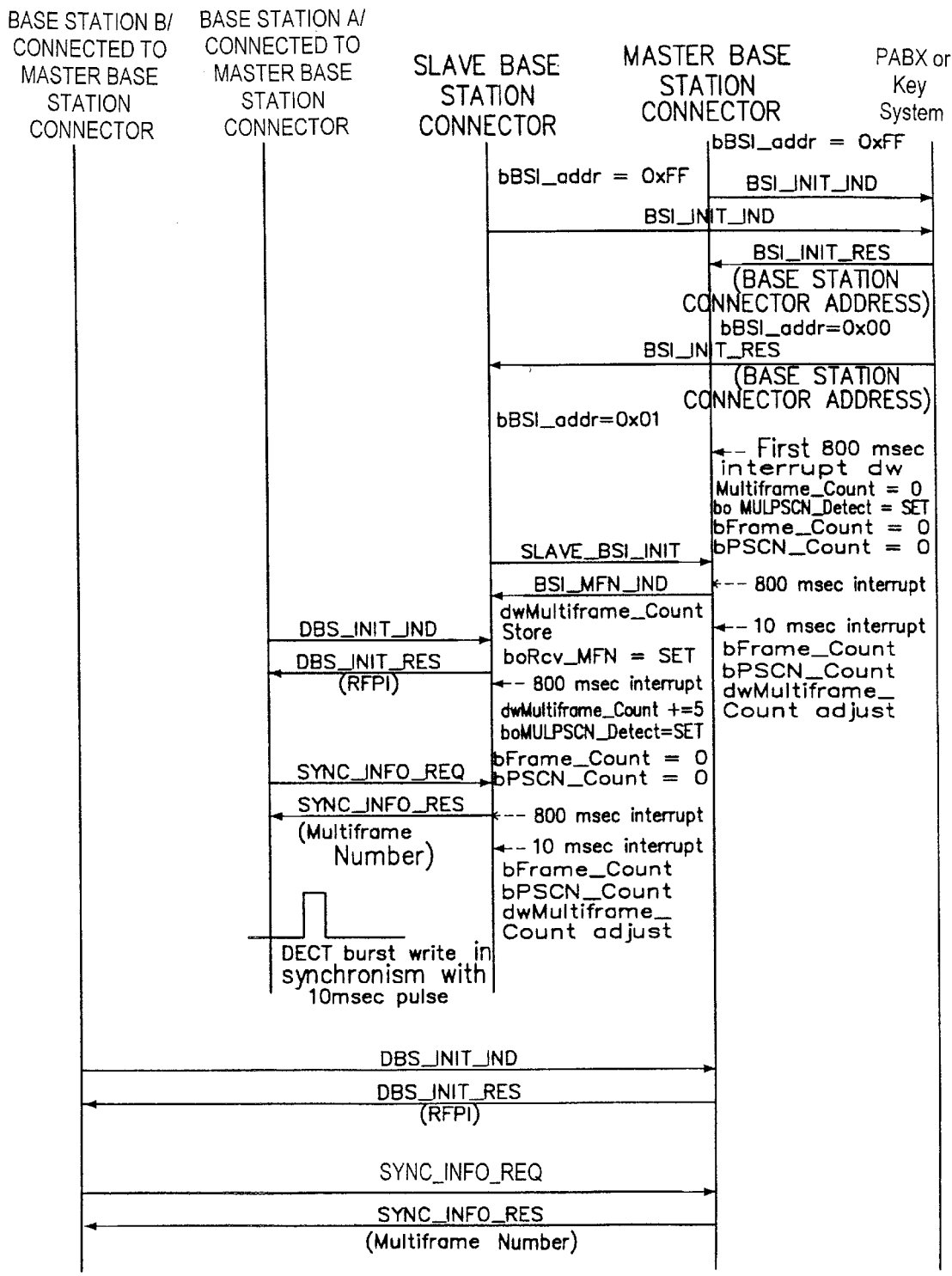
FIG. 5 is a flow chart illustrating a process of synchronizing a fame number, a multiframe number, and a PSCN in every base station according to the principles of the present invention.

FIG. 5 illustrates a process of synchronizing a frame number, a multi-frame number, and a primary scan carrier number (PSCN) in every base stations of the DECT cordless telephone system according to an embodiment of the present invention. With reference to FIGS. 1 through 5, operation of an embodiment according to the present invention will be described hereinbelow.

First, if the master base station connector 120 is initialized in response to a power-on reset or a restart signal, an area bBSI_addr at which a self address is to be stored will be initialized to 0xFF. During initialization, the slave base station connectors 130 and 140 transfer an initialization indication message BSI_INIT_IND to the main system 100. Upon receipt of the initialization indication message BSI_INIT_IND, the main system 100 transfers a master base station connector address and a slave base station connector address to the master base station connector 120 and the slave base station connectors 130 and 140 respectively, by using an initialization response message BSI_INIT_RES. In order to synchronize the frame number, the multi-frame number, and the PSCN of every base stations, the master base station connector 120 and the slave base station connectors 130 and 140 generate a 10 msec pulse and a 800 msec pulse by using clock information provided from the main system 100, in which the 800 msec pulse is synchronized with the 10 msec pulse. The multi-frame includes sixteen (16) frames, and the PSCN utilizes ten (10) carriers during one frame cycle. The frame number and the PSCN simultaneously becomes "0" every 800 msec, so that the 800 msec pulse is used. The 10 msec pulse and the 800 msec pulse are coupled to an interrupt port of the controller 126 to generate an interrupt. Further, the 10 msec pulse is transferred to the base station 200 via the base station connecting unit 124. The base station records a DECT burst in synchronism with the 10 msec pulse. However, if the address value received from the main system 100 is not stored in the area bBSI_addr at which the self address is to be stored, the base station 200 will process nothing due to the interrupt generated by the 10 msec pulse and the 800 msec pulse.

Meanwhile, if a first 800 msec interrupt is generated to the master base station connector 120, then dwMultiframe_Count (4-byte size), bFrame_Count (1-byte size), bPSCN_Count (1-byte size) will be all set to 0 and boMulPSCN_Detect bit will be set to indicate that a process for synchronization has begun. Thereafter, if the 800 msec interrupt is generated, dwMultiframe_Count will increases by 5, and bFrame_Count and bPSCN_Count are set to zero "0." If the 10 msec interrupt is generated, bFrame_Count and bPSCN_Count will increase by a constant one "1"

respectively. Thereafter, if the slave base station connector is designated, the designated slave base station connector will transfer SLAVE_BIS_INIT to the master base station connector 120 and wait for the multiframe number to be received. Upon receipt of the SLAVE_BSI_INIT, the slave base station connector 130 or 140 indicates that there has been a request for the multi-frame number. Meantime, if the 800 msec interrupt is generated, the main system 100 will transfer the multi-frame number to the slave base station connector 130 or 140. Upon receipt of the multi-frame number, the base station connector stores the received multi-frame number into dwMultiframe_Count and set a boRcv_MFN bit to indicate a reception of the multi-frame number. If the first 800 msec interrupt is generated in the state that the boRcv_MFN bit is set, the base station connector will increase the dwMultiframe_Count by 5, set the bFrame_Count and bPSCN_Count to 0, and set a boMulPSCN_Detect bit to indicate that synchronization information being maintained by itself is effective. Thereafter, if the 800 msec interrupt is generated, the base station connector will increase the dwMultiframe_Count and bPSCN_Count by 1, respectively. Then, if a synchronization information request signal SYNC_INFO_REQ is received from base station unit 200 in the state that the boMulPSCN_Dect bit is set, the master base station connector and the slave base station connector will transfer the synchronization information request signal SYNC_INFO_REQ on which the multiframe number is loaded to the base station unit 200, upon generation of a next 800 msec interrupt. At the moment, the frame number and the multi-frame number are set to zero "0." Thus, all the base stations 200 may maintain the same frame number and multi-frame number.

As described in the foregoing, the cordless telephone system of the invention synchronizes the frame number, the multi-frame number and the PSCN, so that the inter-cell handover may be effectively managed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for synchronizing synchronous information in a cordless telephone system, comprising the steps of:

providing a main system and a plurality of primary base stations and a plurality of secondary base stations in a cordless telephone system;

initializing each slave base station connector contained in said main system, each slave base station connector respectively serving a corresponding said plurality of secondary base stations;

requesting a multi-frame transmission to a master base station connector contained in said main system serving said plurality of primary base stations, when an interrupt for synchronization is generated; and when a next interrupt is generated from the master base station connector, transferring a multi-frame number to each said slave base station connector for synchronizing a frame number and the multi-frame number and a primary scan carrier number of all base stations for radio communication services.

2. The method of claim 1, further comprised of generating said interrupt for synchronization at a period of 800 msec.

3. The method of claim 1, further comprised of said main system corresponding to one of a private automatic branch exchange system and a key system.

4. The method of claim 1, further comprised of each base station comprising:

a connecting unit for exchanging signal information with one of the master base station connector and a corresponding slave base station connector of said main system;

a radio-frequency signal processor for allowing communication between the base station with mobile units assigned to the base station;

a digital European Cordless Telecommunications (DECT) protocol processor connected to the radio-frequency signal processor, for processing a physical layer and a medium access control layer of the digital European Cordless Telecommunications (DECT) protocol;

a voice processor disposed between the connecting unit and the digital European Cordless Telecommunications (DECT) protocol processor, for processing voice signal information from the connecting unit for transfer to the digital European Cordless Telecommunications (DECT) protocol processor, and for processing voice signal information from the digital European Cordless Telecommunications (DECT) protocol processor for transfer to the connecting unit; and a controller for controlling operation of the connecting unit, the voice processor, and the digital European Cordless Telecommunications (DECT) protocol processor.

5. A method for synchronizing synchronous information in a cordless telephone system, comprising the steps of:

providing each slave base station connector, each slave base station connector having connected thereto a plurality of base stations:

providing a master base station connector having connected thereto a plurality of base stations;

providing a plurality of subscriber terminals respectively connected to the base stations, wherein the cordless telephone system provides a radio communication service to a terminal subscriber accommodated by one of a private automatic branch exchange system and a key system;

allowing the master base station connector to generate a first interrupt to each slave base station connector, upon initialization of each slave base station connector;

indicating that a synchronization process is started, upon generation of the first interrupt;

when each slave base station connector is designated, allowing a designated slave base station connector to request a multi-frame transmission to the master base station connector; and when a next interrupt is generated from the master base station connector, transferring a multi-frame number to said designated slave base station connector, wherein a frame number and the multi-frame number and a primary scan carrier number of all base stations are synchronized.

6. A cordless telephone system, comprising:

a plurality of primary base stations at a first plurality of different remote locations;

a plurality of secondary base stations at a second plurality of different remote locations;

a private automatic branch exchange system connected to a telephone network for serving a plurality of individual telephones, said private automatic branch exchange system including a master base station connector serving, via wireless transmission, said plurality of primary base stations located at different remote locations, and a plurality of slave base station connectors each serving different secondary base stations of said plurality of secondary base stations at different remote locations, said private automatic branch exchange system synchronizing synchronous information of each base station by:

initializing said plurality of slave base station connectors;

receiving, via said master base station connector, a multi-frame transmission requested from any one of said plurality of primary base stations upon occurrence of an interrupt for synchronization from said master base station connector; and when a subsequent interrupt for synchronization is generated from the master base station connector, transferring a multi-frame number to said plurality of slave base station connectors to synchronize a frame number, a multi-frame number, and a primary scan carrier number of all primary base stations and secondary base stations for radio communication services.

7. The cordless telephone system of claim 6, further comprised of said interrupt for synchronization being generated at a period of 800 msec.

8. The cordless telephone system of claim 6, further comprised of each base station comprising:

a connecting unit exchanging signal information with one of the master base station connector and a corresponding slave base station connector of said private automatic branch exchange system;

a radio-frequency signal processor allowing communication between the base station with mobile units assigned to communicate with the base station;

a digital European Cordless Telecommunications protocol processor connected to the radio-frequency signal processor, for processing a physical layer and a medium access control layer of a protocol; and a voice processor disposed between said connecting unit and said digital European Cordless Telecommunications protocol processor, for processing voice signal information from the connecting unit for transfer to said digital European Cordless Telecommunications protocol processor, and for processing voice signal information from said digital European Cordless Telecommunications protocol processor for transfer to the connecting unit.

9. A cordless telephone system, comprising:

a plurality of primary base stations at a first plurality of different remote locations;

a plurality of secondary base stations at a second plurality of different remote locations;

a private automatic branch exchange system connected to a telephone network for serving a plurality of individual telephones, said private automatic branch exchange system including a master base station connector serving, via wireless transmission, said plurality of primary base stations located at different remote locations, and a plurality of slave base station connectors each serving different secondary base stations of said plurality of secondary base stations at different remote locations, said private automatic branch exchange system synchronizing synchronous information of each base station by:

initializing said plurality of slave base station connectors;

receiving, via said master base station connector, a multi-frame transmission requested from any one of said plurality of primary base stations upon occurrence of an interrupt for synchronization from said master base station connector; and when a subsequent interrupt for synchronization is generated from the master base station connector, transferring a multi-frame number to said plurality of slave base station connectors to synchronize a frame number, a multi-frame number, and a primary scan carrier number of all primary base stations and secondary base stations for radio communication services, further comprised of each base station comprising:

a connecting unit exchanging signal information with one of the master base station connector and a corresponding slave base station connector of said private automatic branch exchange system;

a radio-frequency signal processor allowing communication between the base station with mobile units assigned to communicate with the base station;

a digital European Cordless Telecommunications protocol processor connected to the radio-frequency signal processor, for processing a physical layer and a medium access control layer of a protocol; and a voice processor disposed between said connecting unit and said digital European Cordless Telecommunications protocol processor, for processing voice signal information from the connecting unit for transfer to said digital European Cordless Telecommunications protocol processor, and for processing voice signal information from said digital European Cordless Telecommunications protocol processor for transfer to the connecting unit, and further comprised of said radio-frequency signal processor comprising:

a modulator which is realized by a Gaussian filter for modulating signal information from said digital European Cordless Telecommunications protocol processor;

an up-converter for doubling a frequency of modulation data from the modulator;

a first band-pass filter for filtering a signal output from the up-converter within a frequency band of approximately 1.88 GHz to 1.9 GHz;

a first amplifier for amplifying a power of a signal output from the first band-pass filter;

a switch for enabling one of transmission and reception of a radio-frequency signal via an antenna under control of said digital European Cordless Telecommunications protocol processor;

a second band-pass filter for filtering a signal output received via the antenna within a frequency band of approximately 1.88 GHz to 1.9 GHz;

a second amplifier for amplifying a signal output from the second band-pass filter;

a third band-pass filter for filtering a signal output from the second amplifier within a frequency band of approximately 1.88 GHz to 1.9 GHz;

a down-converter for converting a frequency of a signal output from the third band-pass filter into a signal exhibiting a frequency of 110.592 MHz;

a third amplifier for amplifying a signal output from the down-converter; and a demodulator for demodulating a signal output from the third amplifier for application to said digital European Cordless Telecommunications protocol processor.

10. The cordless telephone system of claim 9, further comprised of said interrupt for synchronization being generated at a period of 800 msec.

11. A method for synchronizing synchronous information in a cordless telephone system, comprising the steps of:

providing a main system and a plurality of primary base stations and a plurality of secondary base stations in a cordless telephone system;

initializing each slave base station connector contained in said main system, each slave base station connector respectively serving a corresponding said plurality of secondary base stations;

requesting a multi-frame transmission to a master base station connector contained in said main system serving said plurality of primary base stations, when an interrupt for synchronization is generated, further comprised of each base station comprising:

a connecting unit for exchanging signal information with one of the master base station connector and a corresponding slave base station connector of said main system;

a radio-frequency signal processor for allowing communication between the base station with mobile units assigned to the base station;

a digital European Cordless Telecommunications (DECT) protocol processor connected to the radio-frequency signal processor, for processing a physical layer and a medium access control layer of the digital European Cordless Telecommunications (DECT) protocol;

a voice processor disposed between the connecting unit and the digital European Cordless Telecommunications (DECT) protocol processor, for processing voice signal information from the connecting unit for transfer to the digital European Cordless Telecommunications (DECT) protocol processor, and for processing voice signal information from the digital European Cordless Telecommunications (DECT) protocol processor for transfer to the connecting unit; and a controller for controlling operation of the connecting unit, the voice processor, and the digital European Cordless Telecommunications (DECT) protocol processor, further comprised of said radio-frequency signal processor comprising:

a modulator which is realized by a Gaussian filter for modulating signal information from the digital European Cordless Telecommunications (DECT) protocol processor;

an up-converter for doubling a frequency of modulation data from the modulator;

a first band-pass filter for filtering a signal output from the up-converter within a frequency band of approximately 1.88 GHz to 1.9 GHz;

a first amplifier for amplifying a power of a signal output from the first band-pass filter;

a switch for enabling one of transmission and reception of a radio-frequency signal via an antenna under control of the digital European Cordless Telecommunications (DECT) protocol processor;

a second band-pass filter for filtering a signal output received via the antenna within a frequency band of approximately 1.88 GHz to 1.9 GHz;

a second amplifier for amplifying a signal output from the second band-pass filter;

a third band-pass filter for filtering a signal output from the second amplifier within a frequency band of approximately 1.88 GHz to 1.9 GHz;

a down-converter for down converting a frequency of a signal output from the third band-pass filter into a signal exhibiting a frequency of 110.592 MHz;

a third amplifier for amplifying a signal output of the down-converter; and a demodulator for demodulating a modulated signal received from the third amplifier for application to the digital European Cordless Telecommunications (DECT) protocol processor; and when a next interrupt is generated from the master base station connector, transferring a multi-frame number to each said slave base station connector for synchronizing a frame number and the multi-frame number and a primary scan carrier number of all base stations for radio communication services.

12. The method of claim 11, further comprised of generating said interrupt for synchronization at a period of 800 msec.

13. The method of claim 11, further comprised of said main system corresponding to one of a private automatic branch exchange system and a key system.

* * * * *